S. A. BARRICKMAN & J. C. HOLT.
SHAFT LEVEL.
APPLICATION FILED FEB. 27, 1911.
1,018,863.
Patented Feb. 27, 1912.
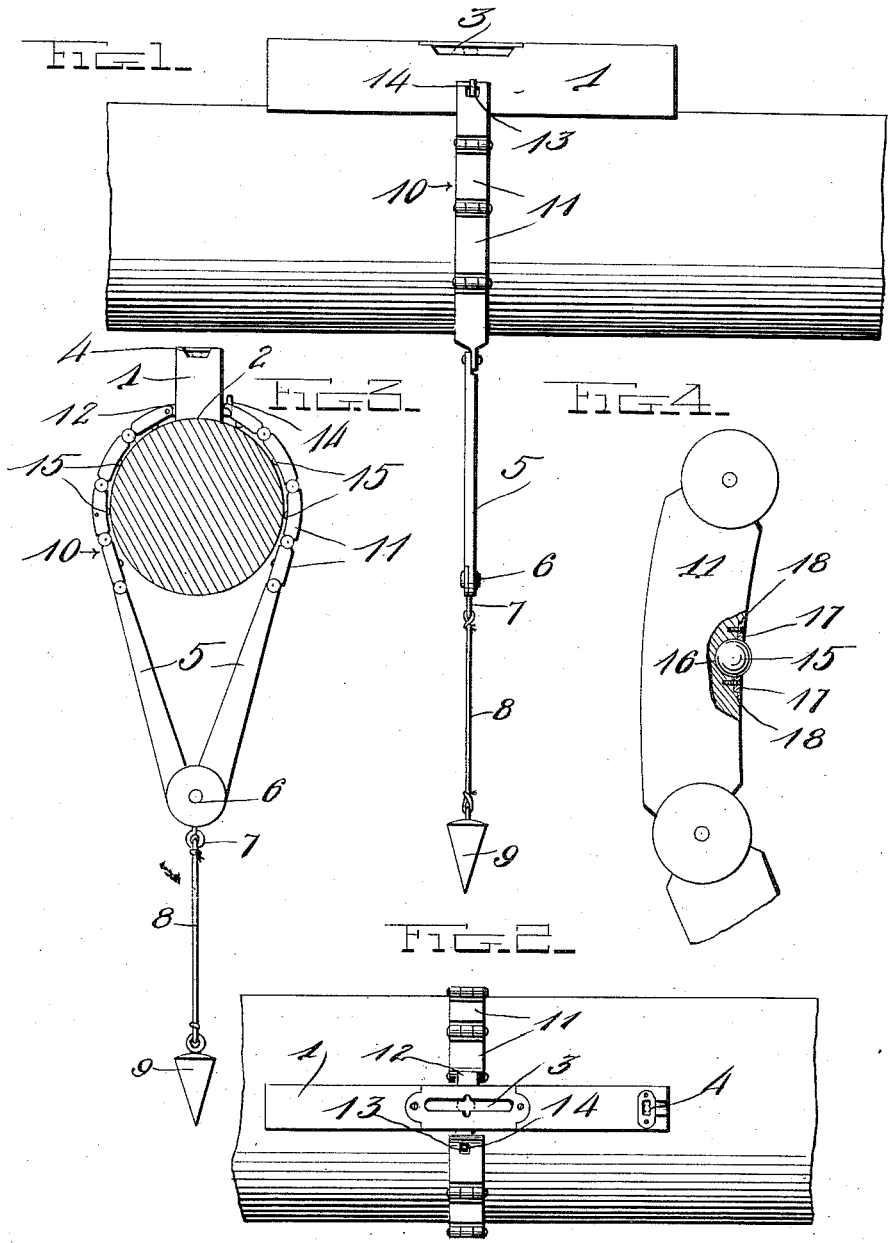
Witnesses
J. R. Pierce
OB Hopkins
Inventors
S. A. Barrickman
J. C. Holt.
by H. B. Willson & Co
Attorneys

UNITED STATES PATENT OFFICE.

SYLEVSTER A. BARRICKMAN AND JAMES C. HOLT, OF RICHWOOD, WEST VIRGINIA; SAID BARRICKMAN ASSIGNOR OF ONE-THIRD TO A. L. CRAIG AND V. H. ODELL, BOTH OF RICHWOOD, WEST VIRGINIA.

SHAFT-LEVEL.

1,018,863.  Specification of Letters Patent.  Patented Feb. 27, 1912.

Application filed February 27, 1911. Serial No. 610,983.

*To all whom it may concern:*

Be it known that we, SYLEVSTER A. BARRICKMAN and JAMES C. HOLT, citizens of the United States, residing at Richwood, in the county of Nicholas and State of West Virginia, have invented certain new and useful Improvements in Shaft-Levels; and we do declare the following to be a full, clear, and exact description of the invention, such as will enable others skilled in the art to which it appertains to make and use the same.

This invention relates to improvements in shaft levels.

One object of the invention is to provide an improved construction of shaft level whereby shafts of various sizes may be quickly and accurately leveled or the position of the same ascertained.

Another object is to provide a level of this character having an improved construction of plumbing mechanism applied thereto.

With the foregoing and other objects in view the invention consists of certain novel features of construction, combination and arrangements of parts as will be more fully described and particularly pointed out in the appended claims.

In the accompanying drawings: Figure 1 is a side view of a portion of a shaft showing the application of the invention thereto; Fig. 2 is a top plan view of the same; Fig. 3 is a vertical cross section through the shaft showing an end view of the level and plumbing mechanism; Fig. 4 is an enlarged side view of one of the links of the plumb bob chain, parts of the link being broken away and in section to show the construction and arrangement of the ball bearing in the side of the same.

Referring more particularly to the drawings, 1 denotes our improved level which is constructed of any suitable material and has its lower side concaved or formed on the arc of a circle as shown at 2 whereby said lower side of the level may be engaged with shafts. In the upper side of the level is provided a central longitudinally disposed spirit glass 3 while in said upper side adjacent to one end is arranged a transversely disposed spirit glass 4. The spirit glass 3 is employed for determining the position of the shaft or ascertaining when the same is in a horizontal position while the transverse spirit glass 4 is employed for ascertaining when the level is in a horizontal position transversely of the shaft and over the center thereof.

In connection with the level 1, we provide a plumbing mechanism comprising a pair of plumb supporting bars 5 the lower ends of which are jointed together as shown at 6 and have arranged on their jointed ends an eye 7 to which is connected the upper end of a plumb bob cord 8 to the lower end of which is connected a suitable plumb bob 9. To the upper diverging ends of the arms 5 are secured flexible connections in the form of chains 10 consisting of a series of curved links 11.

The upper link of one of the chains 10 is pivotally connected to a lug 12 on one side of the level while the upper link of the other chain 10 is provided with an eye 13 adapted to be engaged with a hook 14 formed on the other side of the level as shown. By detachably connecting one of the chains 10 with the level, said chain may be passed around the shaft and engaged with the level after the latter has been arranged in position on the shaft. After thus connecting the free end of the chain with the level the latter is adjusted until the spirit glass 4 therein indicates that the level is in a horizontal position transversely of the shaft whereupon it will be known that the plumb is correct. In order to permit the chains to slide freely around the opposite sides of the shaft while the level is being adjusted thereon the links of the chain are provided with anti-friction bearing balls 15 which are arranged in recesses 16 formed in the inner sides of the links, said balls being revolubly secured in said recesses by annular retaining plates 17 which are secured in annular grooves 18 formed around the outer edges of the recesses 16 as shown. The inner edges of the plates 17 are beveled to fit the curvature of the adjacent outer sides of the balls 15 beyond the center of the same whereby said balls are held in operative position in the links.

By means of our improved level and plumbing mechanism as herein shown and described it will be seen that many of the operations in connection with millwrighting which have heretofore been performed under difficulties and with the use of a number of different instruments may now be quickly and easily performed and with greater accuracy and despatch than was possible under the former methods.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. In a device of the character described, a level having a transverse horizontal spirit glass adapted to rest longitudinally on a shaft, a chain pivotally attached at one end to one side of the level, means for attaching the other end of the chain removably to the other side of the level, and a plumb line centrally depending from the chain.

2. In a device of the character described a level adapted to rest longitudinally on a shaft and provided with a transverse horizontal spirit glass, two chains formed of curved links adapted to hug the shaft, one chain loosely connected to one side of the level near the bottom thereof and the other adapted to be detachably connected to the level at a corresponding point on its opposite side, and a plumb line attached to lower ends of the two chains.

3. In a device of the character described a level adapted to rest longitudinally on a shaft, and provided with a transverse horizontal spirit glass, two chains formed of curved links adapted to hug the shaft, one chain loosely connected to one side of the level near the bottom thereof and the other adapted to be detachably connected to the level at a corresponding point on its opposite side, each link having, seated in its concave side, a bearing ball adapted to contact with the shaft, and a plumb line attached to the lower ends of the two chains.

4. In a device of the character described, a level adapted to rest longitudinally on a shaft, a pair of arms pivotally attached to each other at their lower ends, a chain attached to the outer end of each arm, means for connecting the outer ends of the chains respectively to opposite sides of the level, and a plumb line attached to the pivotally connected ends of the arms.

5. In a device of the character described, a level adapted to rest longitudinally on a shaft, a pair of arms pivotally attached to each other at their lower ends, a chain attached to the outer end of each arm, each chain being composed of curved links to fit around the shaft, said links being pivotally connected together, means for pivotally connecting the outer end of one chain to one side of the level, means for removably attaching the outer end of the other chain to the opposite side of the level, and a plumb line attached to the pivotally connected ends of the arms.

6. A shaft leveling and plumbing device comprising a spirit level having arranged therein longitudinal and transversely disposed spirit glasses, and a concaved lower side whereby the level may be engaged with a shaft, a plumb bob supporting mechanism comprising a pair of pivotally connected diverging arms, a plumb bob line connected to the jointed ends of said arms, a plumb bob connected to said line, flexible connections secured at their lower ends to the upper ends of said arms and connected respectively to the opposite sides of the level whereby said plumb bob is supported and plumbed by the level.

7. A shaft leveling and plumbing device comprising a spirit level having arranged therein longitudinal and transversely disposed spirit glasses, and a concaved lower side whereby the level may be engaged with a shaft, a plumb bob supporting mechanism comprising a pair of pivotally connected diverging arms, a plumb bob line connected to the jointed ends of said arms, a plumb bob connected to said line, chains adapted to connect the upper ends of said arms to the opposite sides of the level, said chains comprising a series of links, bearing balls arranged in the inner sides of said links to provide an anti-frictional engagement between the same and the outer sides of the shaft, a pivot lug formed on one side of said level whereby the upper link of one of said chains is hingedly connected to the level, a hook arranged on the opposite side of the level, an eye formed on the upper link of the chain on this side of the shaft and adapted to be engaged with said hook whereby the chain is detachably connected with the level.

In testimony whereof we have hereunto set our hands in presence of two subscribing witnesses.

SYLEVSTER A. BARRICKMAN.
JAMES C. HOLT.

Witnesses:
    JACK S. GREEN,
    JAMES FINLINSON.

---

Copies of this patent may be obtained for five cents each, by addressing the "Commissioner of Patents, Washington, D. C."